United States Patent [19]

Kulakoff

[11] Patent Number: 5,042,526

[45] Date of Patent: Aug. 27, 1991

[54] VALVELESS TOILET

[76] Inventor: Alexander E. Kulakoff, 145 Fawn La., Portola Valley, Calif. 94025

[21] Appl. No.: 880,388

[22] Filed: Jun. 30, 1986

Related U.S. Application Data

[63] Continuation of Ser. No. 677,234, Dec. 3, 1984, abandoned.

[51] Int. Cl.$^5$ .............................................. F16K 31/18
[52] U.S. Cl. ....................................... 137/451; 4/353; 4/378
[58] Field of Search .................... 4/353, 222, 223–228, 4/378; 137/451; 251/4, 9

[56] References Cited

U.S. PATENT DOCUMENTS

| | | | |
|---|---|---|---|
| 1,010,562 | 12/1911 | Woodward | 4/228 |
| 3,670,751 | 6/1972 | Buswell | 137/451 |
| 3,965,925 | 6/1976 | Gooch | 137/451 |

Primary Examiner—Henry J. Recla
Assistant Examiner—Leo J. Peters
Attorney, Agent, or Firm—Flehr, Hohbach, Test, Albritton & Herbert

[57] ABSTRACT

A toilet flush mechanism comprising a tank holding a water supply and having a valve for flushing a toilet bowl a handle for opening the valve to the toilet bowl for initiating the flushing actions, a water supply entering the tank near the bottom of said tank, for replacing the water in the tank including a flexible tube connected to the supply the extending into the tank, said tube having a first curved portion for carrying the water into the tank, a second bendable portion for controlling the flow of water into the tank and a third extended portion for supplying the flow of water into the tank, and a blout and rod responsive to the water level in the tank for flexing said tube to control water flow into the tank which rises and falls with the water supply level, the rod extending along and being independent of the third portion of said tube, the rod being connected at the other end to the second portion of the tube adjacent the bendable portion thereof for bending said tube in response to movement of said float, said float being always spaced from the first curved portion of the tube and being both physically separate and physically independent of the third portion of the tube and movable along a path between first and second positions, said tube being extended along a relatively straight path to allow water flow into the tank with said float in said first position, said tube being crimped shut to terminate water flow with said float in said second position.

3 Claims, 1 Drawing Sheet

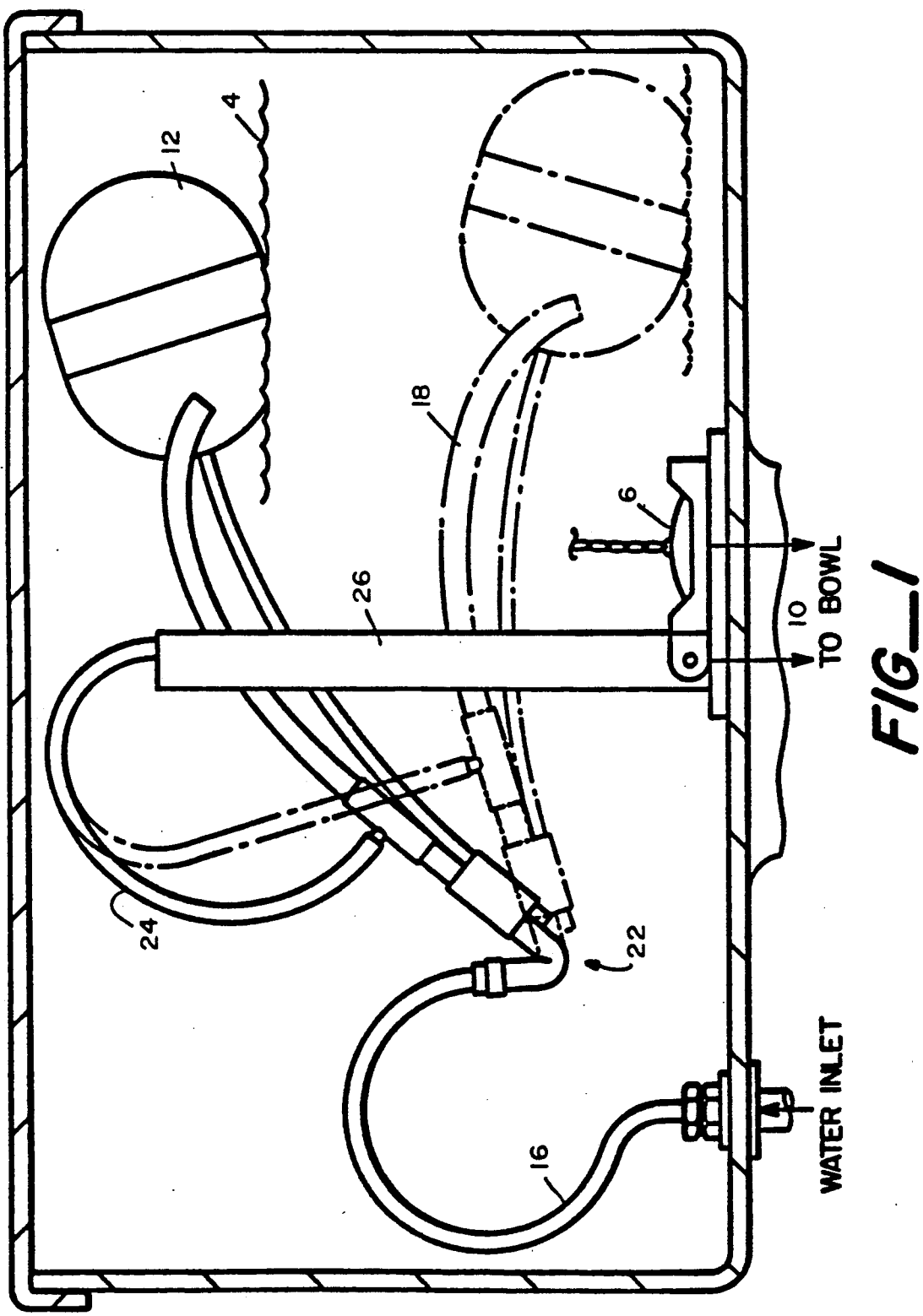

VALVELESS TOILET

This is a continuation of application Ser. No. 677,234 filed Dec. 3, 1984 now abandoned.

This invention is directed generally to the plumbing industry and more particularly to an improved toilet flush mechanism.

One of the problems of home plumbing that almost everyone is familiar with is a noisy or leaky toilet. This is typically caused by a faulty valve mechanism in the reservoir for the toilet. Because of its constant use, the necessity of making the parts at a relatively low cost, as well as the fact that almost all installations are by inexperienced homeowners rather than a trained plumber, the valve mechanism in toilets as presently designed frequently fails. Often, the leak is slow and relatively quiet; however, even a leak such as this can have surprising negative consequences for the homeowner's water bill. As the valve deteriorates further, the toilet becomes noisy and runs constantly.

It is an objective of the present invention to provide an improved toilet flush mechanism.

More specifically, it is an objective of the present invention to provide a toilet flush mechanism which eliminates the need for the valve which is one of the most common points of failure in the tank mechanism.

Another objective of the present invention is to provide a toilet flush mechanism which operates quickly, simply and reliably to provide water inflow to the toilet tank when the tank is emptied to flush the toilet bowl, and a positive water flow shutoff when the tank is filled to the desired level.

These and other objectives of the present invention are provided in a toilet tank system which includes, along with the standard parts which are normally present, an improved means for providing and regulating the water flow into the toilet comprising a plastic tube of polypropylene or the like permanently coupled to a water source. The plastic must be of the kind which has a long life span under repeated crimping, and which is capable of being sufficiently stiff to consistently crimp at about the same point in the tubing. This invention especially consists in providing means responsive to the emptying of water from the water tank to essentially straighten the tube and allow water to flow from the water supply. In response to the water level reaching its predefined level, the tube is crimped to shut off the flow of water in a positive fashion.

In the preferred embodiment, the float and rod combination of the type presently used in toilet tank systems is coupled to an extended portion of the water tube so that as the rod is lowered in the tank, the tube is straightened and the water flows. As the ball rises and the rod changes its angle of inclination within the tank, the tube is crimped and water flow stops.

The objects and features of the present invention which are novel and useful are set forth with particularity in the appended claims. The present invention may be better understood by reference to the following description taken in conjunction with the accompanying drawing wherein FIG. 1 comprises an elevational sectional view of a toilet tank incorporating the present invention and showing the two different positions of the float and rod which place the water supply tube in its open and closed positions.

More specifically, FIG. 1 shows the tank 2 having an indicated water level 4 representing a full tank, i.e., sufficient water in the tank to flush the toilet bowl. A valve 6 is provided which can be opened by moving the handle 8, causing the water to flow out through the now open valve to the toilet bowl along the indicated passageway 10. When this occurs, the float 12 drops from its higher or closed position to its lower or water supply open position. As it moves to this position, the tube 16 which is coupled to the external water supply and in this disclosed embodiment is carried along one end of the rod, is straightened out. Water now flows easily out of the end 18 of this tube. As the float slowly rises along the path 20 indicated by the dotted line, the tube is slowly constricted at the corner 22. As a result, the rate of water flow through the tube is progressively reduced. When the float reaches its top position, the tube is crimped shut.

The tube itself is made of a hard plastic material such as polypropylene or the like, which can be bent a large number of times without cracking. The tube is of sufficient stiffness that it always bends at substantially the same place so that it consistently crimps shut rather that just bending in an arc and failing to cut off the water supply.

It should be noted that a separate tube 24 is provided to provide water into the stand pipe 26 in accordance with normal design practice. The present invention provides a toilet which is no longer subject to the frequent failure at the inlet valve which plagues all homeowners. Moreover, should the inlet tubing for any reason fail, it is very easily replaced, i.e., much more easily than the valves which are presently provided.

Alternatives to the specific embodiment disclosed above may become apparent to a person who studies the above invention disclosure. Therefore, the scope of the present invention is to be limited only by the following claims.

What is claimed:

1. A toilet flush mechanism comprising a tank holding a water supply and having a valve for flushing a toilet bowl, means for opening the valve to the toilet bowl for initiating the flushing actions, a water supply entering the tank near the bottom of said tank, for replacing the water in the tank including a flexible tube connected to the supply and extending into the tank, said tube having a first curved portion for carrying the water into the tank, a second bendable portion for controlling the flow of water into the tank and a third extended portion for supplying the flow of water into the tank, and means responsive to the water level in the tank for flexing said tube to control water flow into the tank comprising a float which rises and falls with the water supply level, the means for flexing the tube comprising a separate rod connected at one end to the float, the rod extending along and being independent of the third portion of said tube, the rod being connected at the other end to the second portion of the tube adjacent the bendable portion thereof for bending said tube in response to movement of said float, said float being always spaced from the first curved portion of the tube and being both physically separate and physically independent of the third portion of the tube and movable along a path between first and second positions, said tube being extended along a relatively straight path to allow water flow into the tank with said float in said first position, said tube being crimped shut to terminate water flow with said float in said second position.

2. A toilet flush mechanism as claimed in claim 1 wherein said flexible tube comprises a firm flexible plastic material repeatedly bendable at a point along its length inside the tank.

3. A toilet flush mechanism as claimed in claim 2 wherein said tube is polypropylene.

* * * * *